Jan. 26, 1965 G. G. LA PORTE 3,166,870
AUXILIARY MOVABLE SHELTER
Filed May 31, 1960 3 Sheets-Sheet 1

INVENTOR.
Gordon G. LaPorte
BY
ATTORNEY

Jan. 26, 1965  G. G. LA PORTE  3,166,870
AUXILIARY MOVABLE SHELTER
Filed May 31, 1960  3 Sheets-Sheet 2

INVENTOR.
Gordon G. LaPorte
BY
ATTORNEY

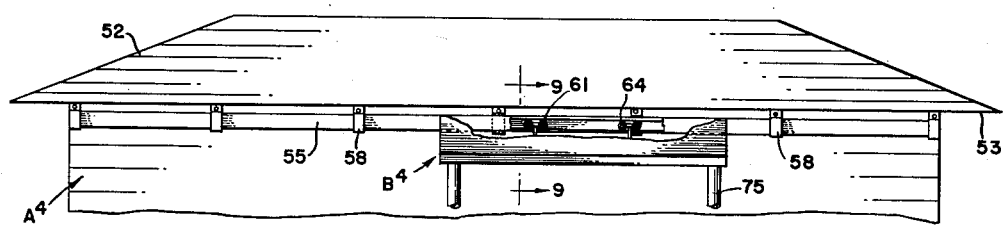
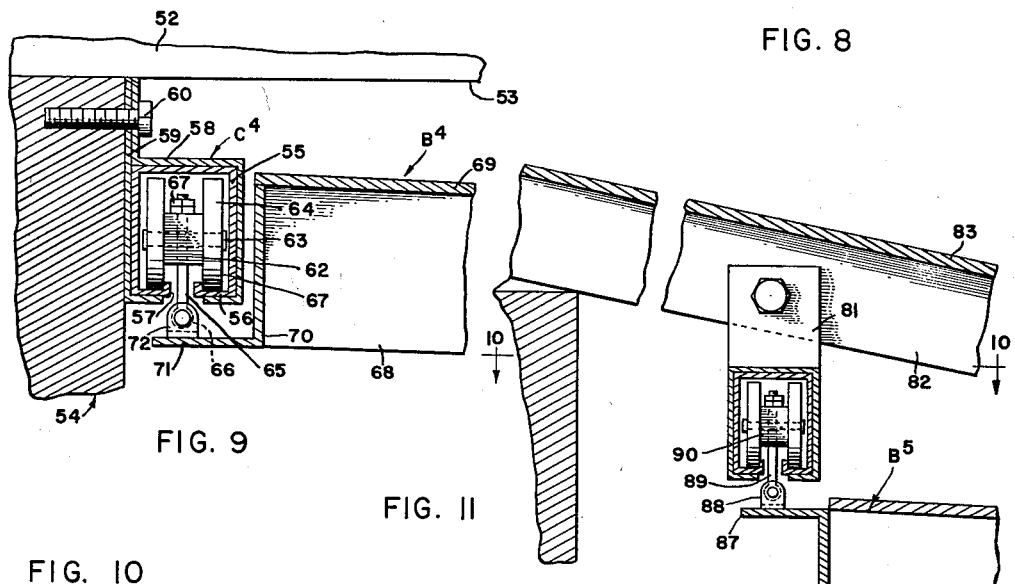
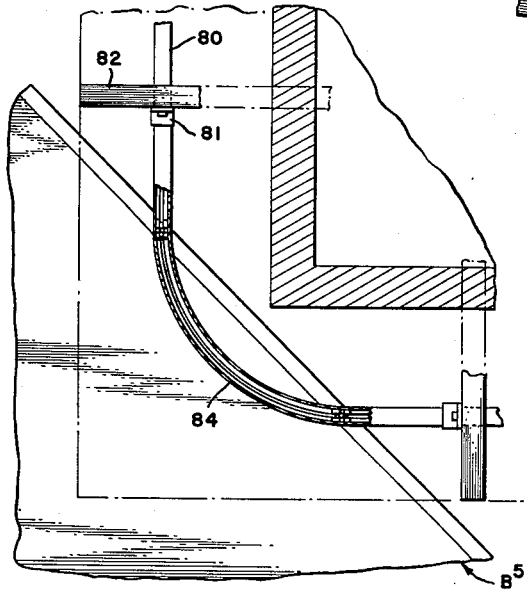
FIG. 8
FIG. 9
FIG. 10
FIG. 11
FIG. 12
INVENTOR
Gordon G. LaPorte
BY
ATTORNEY United States Patent Office 3,166,870
Patented Jan. 26, 1965

3,166,870
AUXILIARY MOVABLE SHELTER
Gordon G. La Porte, Tupper Lake, N.Y.
(9842 N. 35th St., Phoenix, Ariz.)
Filed May 31, 1960, Ser. No. 33,613
8 Claims. (Cl. 50—48)

This is a continuation-in-part of application, Serial No. 834,743, filed August 19, 1959, and now abandoned.

This invention relates to structures providing shelter from the elements, particularly those of a type used for human habitation. Such a structure, whether fixed or mobile, is commonly provided with a roof member or canopy extending out from one side to provide a sheltered area which may be used as a car-port, porch, patio or living area. This roof structure also shields the structure itself on that side from the elements. Particularly in warmer sections of the country or during hot weather, such a shaded area is highly desirable. However, a fixed structure has the disadvantage that it can provide shelter for only one area and shield the structure in only one direction, and since the sun in summer travels more than 180° from east to west, a fixed shelted has its maximum effect for only a short time.

The present invention has for its principal object the provision of the maximum effect of a shelter by combining with a fixed structure an auxiliary movable roof member connected to the fixed structure so that it may be moved to different positions to shelter different areas adjacent the structure and to shield different portions of the structure contiguous to those areas.

Another object is to connect a movable shelter to a low-roofed structure so that it extends outwardly of the structure and so that it can be moved along the side, or sides and ends of the structure, and may be angularly adjusted relative to the structure, in order to provide the maximum shelter effect over a selected area adjacent the structure, and to shield a portion of the structure in the desired direction.

Another object is to attach an auxiliary movable roof member or canopy to a stationary structure so that it may be tilted about a horizontal axis, thereby inclining the roof member within its limits of movement to provide the maximum shelter effect in the desired direction.

Another object is to provide an auxiliary movable roof member or canopy extending outwardly from a stationary structure with a universal connection to the structure and spaced adjustable supports spaced from the connection so that the position and inclination of the auxiliary roof member may be selected by adjusting and positioning the supports.

Another object is to provide shelter for areas adjacent different sides of a structure and to shield the structure on different sides by an auxiliary roof member connected to said structure for movement about a vertical axis to different positions in which it projects outwardly beyond said structure in different directions.

Another object is to support a canopy or roof member for translatory and angular movement over a surface, so as to shelter a selected portion of said surface, and at such inclination to said surface as to produce the maximum effect.

This application discloses further improvements on the invention disclosed in Serial No. 798,647, filed March 11, 1959, now Patent No. 3,091,056, for Shelter.

In the drawings:

FIG. 8 is a front elevation of another structure embodying the invention.

FIG. 9 is a cross section on line 9—9 of FIG. 8.

FIG. 10 is a top plan view of another embodiment of the track, showing the track broken away in parts and the structure in section on line 10—10 of FIG. 11.

FIG. 11 is a detail view in section of the means for supporting the movable roof member of FIG. 10 on the house.

FIG. 12 is a detail of a modification of the supporting means.

Figure 1:
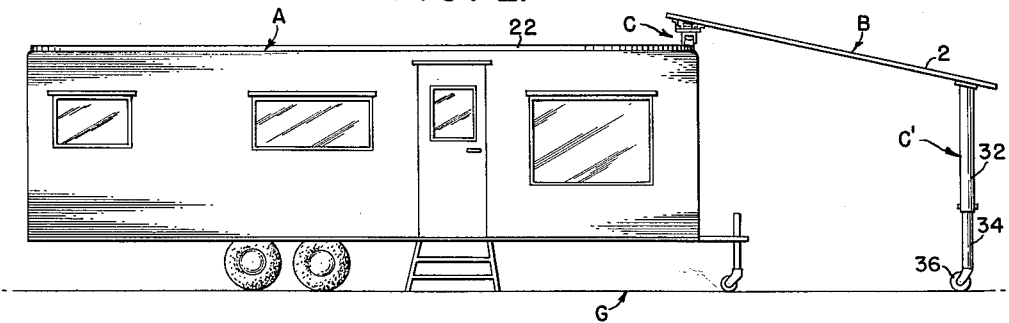
FIG. 1 is an elevational view of a trailer with the movable shelter positioned to extend beyond one end.
Figure 2:
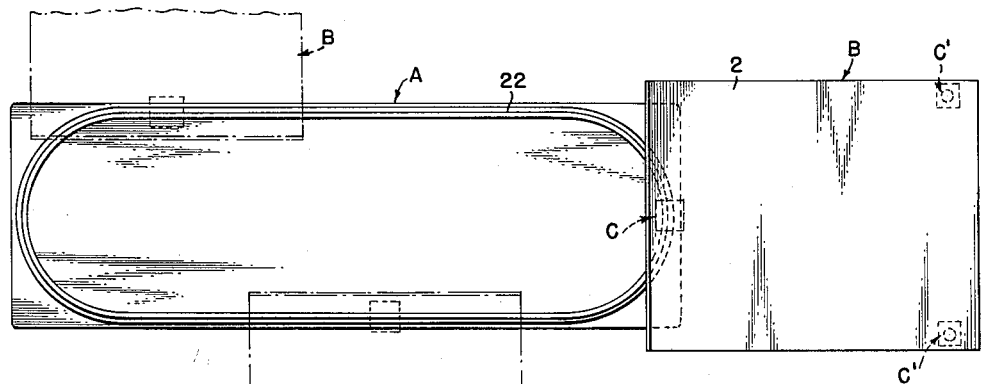
FIG. 2 is a top plan view of the structure of FIG. 1, with alternate positions of the movable shelter indicated in dotted lines.
Figure 2:
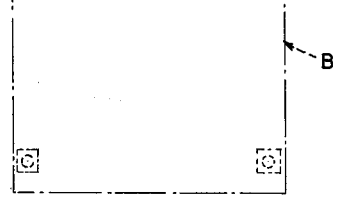

As an illustration of one embodiment of my invention, there is shown a trailer A stationarily positioned on the surface G having attached a movable roof member or canopy B supported on the trailer by connection C and on the surface G by supports C'.

The movable shelter or roof member B formed by a panel 2 has near one end a swivel plate 4 attached by bracket members 6, so that the roof member is inclined when the plate 4 is horizontal. This plate has a centrally located downwardly projecting stud 8 on its lower side to connect pivotally a bracket 12. Nut 14 threaded on stud 8 prevents separation of these members.

The bracket 12 is formed with a horizontal portion 16 on which the plate 4 rests, and two legs extending downwardly from opposite ends of said plate. A bolt 18 passes through these legs and through a roller 20 to support the bracket and roof member on the roller.

Figure 4:
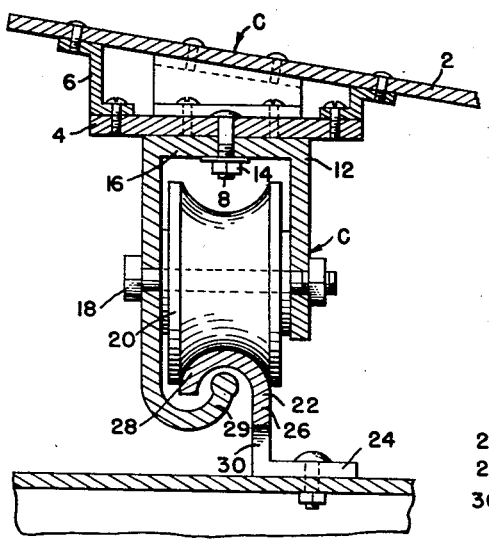
FIG. 4 is a sectional view along line 4—4 of FIG. 3, also showing the top of the movable shelter with the connecting member fixed to it.
Figure 3:
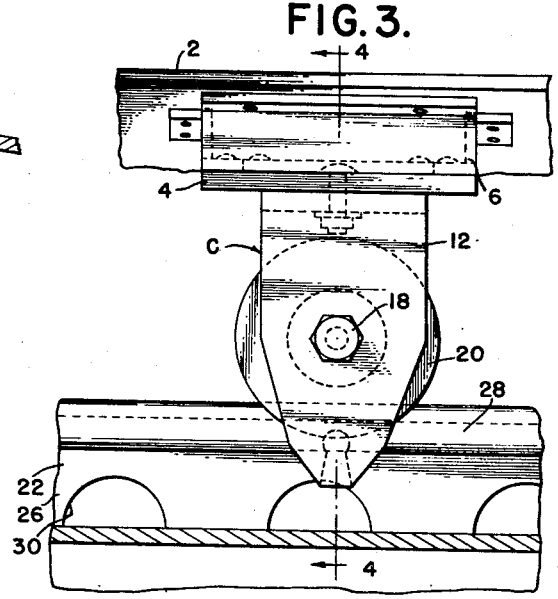
FIG. 3 is an elevational view of the connection of the movable shelter to the roof of the trailer.
Figure 5:
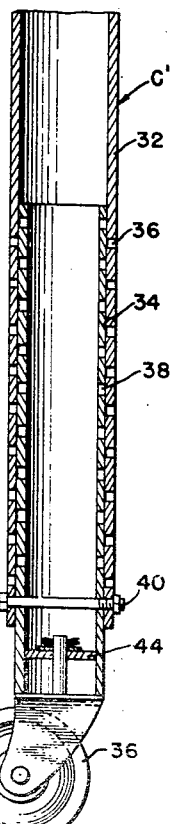
FIG. 5 is a vertical section through one of the standards supporting the outer end of the movable shelter.

The top of the trailer is provided adjacent its edge with a rail 22 forming a track for roller 20 so that the end of the roof member may be moved along the sides and ends of the trailer. This rail member, as seen in section in FIG. 4, has a horizontal flange 24 fixed to the roof of the trailer, a wall 26 extending vertically from one end of the flange, and a laterally extending curved track portion 28 to support the transversely curved periphery of the roller 20. The flange 24 is discontinuous because of the provision of notches 30 extending into wall 26, as seen in FIG. 3, to allow water to drain off the roof of the trailer. The inner leg of bracket 12 extends downwardly below the edge of the track 28 and is curved laterally and upwardly as at 29 to underlie the track with sufficient clearance for necessary movement. This connection allows movement of the roof member B along the edge of the trailer roof, and also universal movement about the connection C. Thus the roof member B may rotate about the vertical axis of stud 8, may rock about the horizontal axis of roller 20 and bolt 18, or may also pivot about a horizontal axis perpendicular to the axis of roller 20, because of the curved surfaces on the roller and track 28.

The opposite or outer end of the movable shelter B is supported by standards C'. Each standard is formed by two telescoping box sections 32 and 34, each of which has a series of holes 36, 38 through which a bolt 40 may pass, thus providing for adjustment of the length of the standard. Each upper section 32 is secured to the roof member and each lower section 34 has a caster wheel 39 mounted thereon. The end of the section 34 rests on the caster, and the stem passes through a web 44 to maintain the stem vertical.

Figure 6:
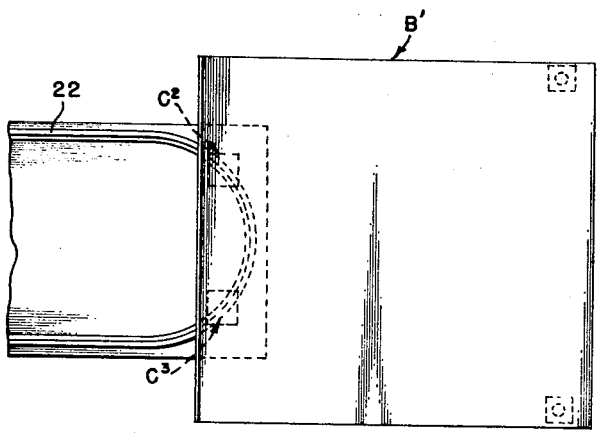
FIG. 6 is a fragmentary view of a modification, showing a wide shelter with two conections to the trailer.

In some instances, when the roof member B' is very wide and it may be desirable to support the end at two points, two connections C², C³ may be used to support the member on the rail as shown in FIG. 6, the swivel action allowing the two rollers to follow the track.

Figure 7:
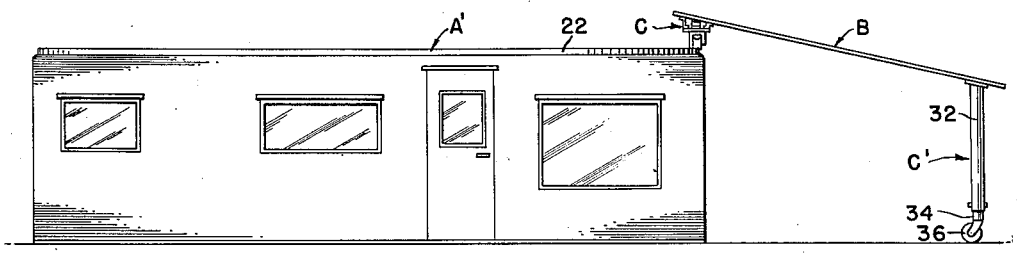
FIG. 7 is a view showing the body resting directly on the ground, illustrating how the standards may be shortened to accommodate the lower structure.

FIG. 7 shows how adjustment may be made for height of the stationary structure. Here the trailer body A' is shown resting on the ground, but by shortening the standards C', the roof member B will be the proper height.

In the embodiment shown in FIGS. 8 and 9, an auxiliary roof member is provided which is movable to different positions along one side of a dwelling house. In this form, the building A⁴ has a roof 52 having eaves 53 extending horizontally beyond the walls 54. Along one side below the eaves, a rail 55 is fixed to the wall 54. The rail 55 is of rectangular section formed with spaced bearing flanges 56, 56 on the lower side separated by slot 57 opening downwardly. Pairs of bracket members 58, 59 support the rail 55 at spaced intervals and are fastened to the wall 54 by fasteners 60. Supporting hangers 61 are composed of a body 62 supported on axles 63 and wheels 64. A bolt or rod 65 having an eye-head 66 extends through the body 62 and is supported thereon by nuts 67. As will be seen in FIG. 8, a plurality of trucks are used to support the auxiliary roof member B⁴.

The auxiliary roof member B⁴ is constructed of rectangular, tubular or channel-shaped framing members 68 on which is mounted a light panel member 69. These members may be of any light-weight construction; for example, the panel 69 may be of fiberglass or light metal and the framing members 68 of light metal. On the ends of the framing members adjacent the building, an angle strip 70 is secured, as by welding with its flange 71 at the lower side underlying the rail 55. Each eye-bolt 65 is secured to this flange 71 by a clevis 72 fastened to flange 71, a pin extending through the clevis 72 and the eye 66 of bolt 65. This construction assures a firm support for the edge of the auxiliary roof member B⁴ adjacent the building, and at the same time provides for angular movement of the auxiliary roof member B⁴ to vary its inclination, as well as for movement along the wall of the building to any desired position. Uprights 75 similar to those shown at C' in FIG. 1 support the outer edge of member B⁴.

This form is especially desirable in many houses which have larger glass areas on the side and need shade in hot weather. In cold weather, when sunshine is very desirable, the auxiliary roof may be moved to the opposite end of the building to admit the light. Or it may be used to shelter the porch or living space inside in inclement weather. The overhanging eaves extending over the auxiliary roof member cooperate in shielding the underlying area and house under these conditions.

In the form shown in FIGS. 10 and 11, the rail 80, similar to the rail in FIG. 9, is supported on brackets 81 fixed to the rafters 82 on the under side of the eaves of roof 83. The rail 80 extends around the corner of the building and along adjacent sides, a curved section 84 providing for turning movement of roof member B⁵.

A Z-shaped angle member 85 fixed to the framing members 86 as shown in FIG. 11, has an upper horizontal flange 87 to which clevises 88 are fastened. The eye-bolt 89 supports the clevis 88 on the body of the hanger 90, in the same manner as in FIG. 9. Only two hangers 90 are used, so that the pivotal movement will allow the auxiliary roof member to turn the corner as shown in FIG. 10.

The form shown in FIGS. 10 and 11 thus allows movement of the auxiliary roof member along adjacent sides of the building, as well as to different positions along the same side as in FIGS. 8 and 9.

FIG. 12 shows a detail of a hold-down device which may be used with any form of the invention to prevent movement by severe storms. The standard 92, which may be similar to that at C' in FIG. 1, for example, is provided with a bracket 93. A concrete base for supporting the standard has an eye 94 secured by stud 95, the eye being receivable in recess 96 in the concrete base when not in use. A turnbuckle 97 may be used to connect the bracket 93 and eye 94, thereby securely anchoring the auxiliary roof member to the ground.

The roof member B, which may be constructed of light materials, may readily be shifted to any position relative to the stationary structure to shelter that portion of the structure and the adjacent area. The movement about a horizonal axis at support C or C², C³ and the longitudinal adjustability of the standards C' provide for positioning the movable shelter on rough or irregular ground, and at the desired angle to the horizontal. The member B may be designed for ready removal either by tilting sufficiently that the end of the leg of bracket 12 may be withdrawn from the track, or by disconnection of the supporting means on the stationary structure.

The structure shown is for the purpose of illustrating particular embodiments of the invention. It is obvious that other embodiments may be designed, and that many variations can be adopted in the construction without departing from the essential characteristics of the invention which are defined in the following claims.

I claim:

1. The combination with a structure having a fixed roof, of a movable roof member having one edge overlying an edge of said fixed roof, said roof member extending laterally beyond said structure, said fixed roof having a track adjacent its edge curved to extend along said edge in a plurality of directions, support means for said edge of said movable roof member, said support means including a bracket pivoted on said roof member, a roller mounted on said bracket and bearing on said track to support said edge of said roof member for movement along said track, said bracket having a leg extending downwardly and laterally to underlie said track, a plurality of supports for said roof member including a longitudinally extensible standard fixed to said roof member outwardly of said structure, said standard comprising telescoping upper and lower sections, said upper section being fixed to said movable roof member and said lower section having a ground engaging wheel, and means adjustably connecting said two sections for fastening them in any of a plurality of extended positions.

2. The combination with a housing structure having sides and a fixed roof fixed to and extending over and extending outwardly beyond said sides, of a movable roof member extending laterally from said structure and means supporting said movable roof member including a bearing member positioned beneath the outwardly extending portion of said fixed roof and having angularly connected portions extending along adjacent sides of said structure, a pair of spaced bearing means movable on said bearing member and supporting said movable roof member on said bearing member, each of said bearing means being connected to said movable roof member and formed to provide relative movement about a horizontal axis and about a vertical axis, so that said bearing means may accommodate movement along angular portions of said bearing member, and vertical support means spaced from said structure fixed to said movable roof member for movably supporting said movable roof member.

3. The combination with a housing structure having vertically extending sides forming its periphery and a fixed roof fixed to and supported on said sides, of a movable roof member supported adjacent one extremity by said periphery and movable to a plurality of positions in each of which the major portion of said movable roof member extends horizontally beyond said structure, said roof and roof member having overlapping portions, a horizontal track mounted on said fixed roof and extending along adjacent sides of said structure inwardly of the edge of said fixed roof, bearing means fixed to said movable roof member and supported on said track, said bearing means being formed for translatory movement along said track and angular movement about a vertical axis so that said movable roof member is movable from one side to an adjacent side, and support means connected to said movable roof member and spaced from said structure for supporting said movable roof member for translatory movement, so that said movable roof member may be moved along said structure on said track and support means to different positions.

4. The combination with a housing structure having vertically extending sides forming its periphery and a fixed roof fixed to and supported on said sides of an auxiliary movable roof member extending laterally from said structure, and means supporting said auxiliary roof member including cooperating relatively movable bearing means formed to provide relative linear movement and relative angular movement about vertically and horizontally extending axes, said cooperating bearing means being connected to said auxiliary roof member and said structure along adjacent sides thereof and supporting said auxiliary roof member for translatory movement along adjacent sides of said structure and for angular movement relative to said structure about vertically and horizontally extending axes, and adjustable support means spaced from said structure supporting said movable roof member during translatory and angular movement and adjustable to vary the inclination of said auxiliary roof member about said horizontal axis.

5. The combination with a substantially rigid, unitary housing structure bordered by a horizontally extending surface and comprising supporting means extending vertically above said surface and forming the periphery of said structure and a fixed roof spaced vertically above said surface and fixed to and supported on said supporting means along said entire periphery so that said supporting means completely surrounds the space within said periphery and said fixed roof overlies said space, of an auxiliary movable roof member spaced vertically above said surface and extending horizontally from the periphery of said structure and movable along said periphery to different spaced positions in each of which its major portion extends horizontally beyond the periphery of said structure and overlies a different portion of said surface adjacent said periphery and means supporting said auxiliary roof member for movement to said different positions comprising a first bearing means supported on said supporting means and a second bearing means connected to said auxiliary roof member, said first and second bearing means being formed for relative angular movement about a vertical axis so as to support one extremity of said auxiliary roof member on said structure for horizontal angular movement of said auxiliary roof member along the periphery of said structure to said different spaced positions and vertically extending support means spaced outwardly from said structure and fastened to said auxiliary roof member and having bearing means movably supporting the opposite extremity of said auxiliary roof member spaced above said surface for movement over said surface to said different positions, so that said auxiliary roof member may be moved to said positions to shelter different portions of said horizontally extending surface and adjacent parts of said structure.

6. The combination with a substantially rigid, unitary housing structure bordered by a horizontally extending surface and comprising supporting means extending vertically above said surface and forming the periphery of said structure and a fixed roof spaced vertically above said surface and fixed to and supported on said supporting means along said entire periphery so that said supporting means completely surrounds the space within said periphery and said fixed roof overlies said space, of an auxiliary movable roof member spaced vertically above said surface and extending horizontally from the periphery of said structure and movable along said periphery to different spaced positions in each of which its major portion extends horizontally beyond the periphery of said structure and overlies a different portion of said surface adjacent said periphery and means supporting said auxiliary roof member for movement to said different positions comprising a first bearing means extending horizontally along said structure and supported on said supporting means and a second bearing means connected to said auxiliary roof member and cooperating with said first bearing means for horizontal angular movement about a vertically extending axis and for translatory movement so as to support said auxiliary roof member on said structure for horizontal angular and translatory movement of said auxiliary roof member along the periphery of said structure to said different spaced positions.

7. The combination in claim 6 in which said means supporting said auxiliary roof member includes support means spaced from said bearing means supporting the outer extremity of said auxiliary roof member for movement to said different positions.

8. The combination in claim 6 in which said means supporting said auxiliary roof member includes support means spaced outwardly from said structure supporting the outer extremity of said auxiliary roof member for movement to said different positions.

References Cited by the Examiner

UNITED STATES PATENTS

| 266,829 | 10/82 | Johnston. | |
|---|---|---|---|
| 439,376 | 10/90 | Blanchard | 20—1 |
| 1,809,093 | 6/31 | Willard. | |
| 1,841,321 | 1/32 | Arnstein et al. | |
| 1,973,029 | 9/34 | Walston | 50—51 |
| 2,229,908 | 1/41 | Wenneborg | 50—48 |
| 2,585,695 | 2/52 | Snow | 14—71 |
| 2,716,785 | 9/55 | Schoen. | |
| 2,741,195 | 4/56 | Hartzner | 50—51 |
| 2,767,669 | 10/56 | Tyree | 50—250 |
| 2,811,935 | 11/57 | Jones | 50—4 |
| 2,974,449 | 3/61 | Leeper. | |

FOREIGN PATENTS

| 22,310 | 1892 | Great Britain. |
|---|---|---|
| 477,245 | 6/29 | Germany. |
| 464,560 | 4/37 | Great Britain. |

OTHER REFERENCES

Engineering News-Record; pages 44–48, Jan. 26, 1956.
Civil Engineering, page 78, February 1956.

EARL J. WITMER, *Primary Examiner.*

WILLIAM I. MUSHAKE, JACOB L. NACKENOFF,
*Examiners.*